United States Patent [19]
Zheng

[11] Patent Number: 5,661,829
[45] Date of Patent: Aug. 26, 1997

US005661829A

[54] OPTICAL ISOLATOR

[75] Inventor: Yu Zheng, Sunnyvale, Calif.

[73] Assignee: Oplink Communications, Inc., San Jose, Calif.

[21] Appl. No.: 618,189

[22] Filed: Mar. 19, 1996

[51] Int. Cl.⁶ ........................................ G02B 6/32
[52] U.S. Cl. ............................ 385/33; 250/227.19
[58] Field of Search ................... 385/11, 31–35, 385/16, 123, 130; 359/497, 119, 501; 356/358, 375, 345, 369; 250/227.19; 348/25, 61, 273, 335, 340, 571

[56] References Cited

U.S. PATENT DOCUMENTS

| | | | |
|---|---|---|---|
| 4,976,543 | 12/1990 | Scheck et al. | 356/375 |
| 4,978,189 | 12/1990 | Blonder et al. | 385/35 |
| 5,398,681 | 3/1995 | Kupershmidt | 356/364 |
| 5,471,306 | 11/1995 | Yui et al. | 356/367 |
| 5,475,370 | 12/1995 | Stern | 356/369 |
| 5,517,303 | 5/1996 | Cole et al. | 250/227.19 |
| 5,528,287 | 6/1996 | Stern | 348/25 |
| 5,532,738 | 7/1996 | Stern | 356/369 |
| 5,546,486 | 8/1996 | Shih et al. | 385/31 |
| 5,566,259 | 10/1996 | Pan et al. | 385/11 |

*Primary Examiner*—Akm E. Ullah
*Attorney, Agent, or Firm*—Benman Collins & Sawyer

[57] ABSTRACT

A system and method for providing an optical isolator comprising a first collimating means, a core, and a second collimating means is disclosed. The first collimating means comprises at least a first optical fiber holder, a first lens, and a first collimator holder. The core comprises a first polarizer, a polarization rotation means, and a second polarizer. The second collimating means comprises at least a second optical fiber holder, a second lens, and a second collimator holder. One aspect of the method and system provides a quartz collimator aligner in a collimating means. The quartz collimator aligner aligns the optical fiber holder and the lens. The collimator holder is disposed around the quartz collimating aligner. The quartz collimator aligners improve the alignment of the collimator, thereby reducing insertion loss. The smoothness quartz collimator aligners also increases return loss. Another aspect of the method and system provides a core assembly holder in which the polarization rotation means is disposed. This embodiment increases the ability to adjust the orientation of the first and second polarizers.

36 Claims, 3 Drawing Sheets

OPTICAL ISOLATOR

FIELD OF THE INVENTION

The present invention relates to a method and system for use in optical fiber technology and more particularly to a method and system for providing an optical isolator.

BACKGROUND OF THE INVENTION

Signal generators used in fiberoptic technology, typically semiconductor lasers, are highly sensitive to light reflected back into the signal generator. Reflected light causes instability in the laser and noise in the signal. Thus, optical isolators were developed. Optical isolators transmit light in the direction of propagation of the signal, but block reflected light traveling opposite to the direction of propagation of the signal.

Typical optical isolators are comprised of a first collimator, a core assembly, and a second collimator. The first collimator holds an input optical fiber, while the second collimator holds the output optical fiber. The core assembly is typically comprised of a first polarizer, a faraday rotator, and a second polarizer.

Currently, optical isolators are subject to several constraints. First, the ratio of insertion loss to return loss must be low. Insertion loss is the loss in intensity of the signal as it propagates forward through the optical isolator. Return loss is the loss in intensity of any light, primarily reflected light, traveling opposite to the direction of propagation of the signal. Insertion loss and return loss of optical isolators are primarily determined by the insertion and return losses of the collimators. Lower insertion loss requires good alignment of each collimator's components. Return loss is raised by ensuring that the components of each collimator are clean or smooth.

Another constraint in the utility of optical isolators is their ability to be used in a variety of environments. One method of affixing the collimators uses epoxy. However, epoxy is damaged when subjected to drastic temperature changes. Consequently, the optical isolator cannot withstand variations in the environmental conditions.

Soldering techniques have been used to affix the collimators to the holders in place of epoxy in order to provide a collimator better able to function in a variety of environments. However, soldering introduces several problems. High temperature solders damage the alignment of collimators. Low temperature solders are expensive and provide weaker bonding than high temperature solders. Some solders also require flux, which contaminates collimator components, thereby increasing insertion loss.

In order to optimize performance of the optical isolator, the isolation peak position should be adjustable. Thus, the core should be modifiable in order to provide the optimal isolation peak position.

Finally, commercial use of optical isolators is limited due to their cost. Typical optical isolators achieve the requisite alignment, cleanliness, and mechanical characteristics only at great expense.

Accordingly, what is needed is a system and method for an optical isolator having the requisite ratio of insertion loss to return loss, mechanical characteristics, environmental flexibility, and the ability to optimize performance. It would also be beneficial if such an optical isolator could be provided at lower cost. The present invention addresses such a need.

SUMMARY OF THE INVENTION

A system and method for providing an optical isolator comprising a first collimating means, a core, and a second collimating means is disclosed. The first collimating means comprises a first optical fiber holder, a first lens, and a first collimator holder. The core comprises a first polarizer, a polarization rotation means, and a second polarizer. The second collimating means comprises a second optical fiber holder, a second lens, and a second collimator holder.

One embodiment of the method and system provides a collimating means further comprising a quartz collimator aligner. The quartz collimator aligner aligns the optical fiber holder and the lens. The collimator holder is disposed around the quartz collimator aligner. The quartz collimator aligners improve the alignment of the collimator, thereby reducing insertion loss. The smoothness quartz collimator aligners also increases return loss.

Another aspect of the method and system provides a core having the polarization rotation means disposed within the core assembly holder. This embodiment increases the ability to adjust the orientation of the first and second polarizers.

Another embodiment of the method and system provides an optical isolator including a core holder having at least one aperture therein and a plurality of solder joints connecting the second collimator holder to the core holder. In this embodiment, each of a portion of the plurality of solder joints is at least partially disposed in each of the at least one aperture in the core holder. This reduces the need for epoxy for a mechanical connection. The solder joints may also be flux-less, thereby reducing insertion loss. Through each of these improvements, overall system performance is enhanced.

DESCRIPTION OF THE INVENTION

The present invention relates to an improvement in optical isolators. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
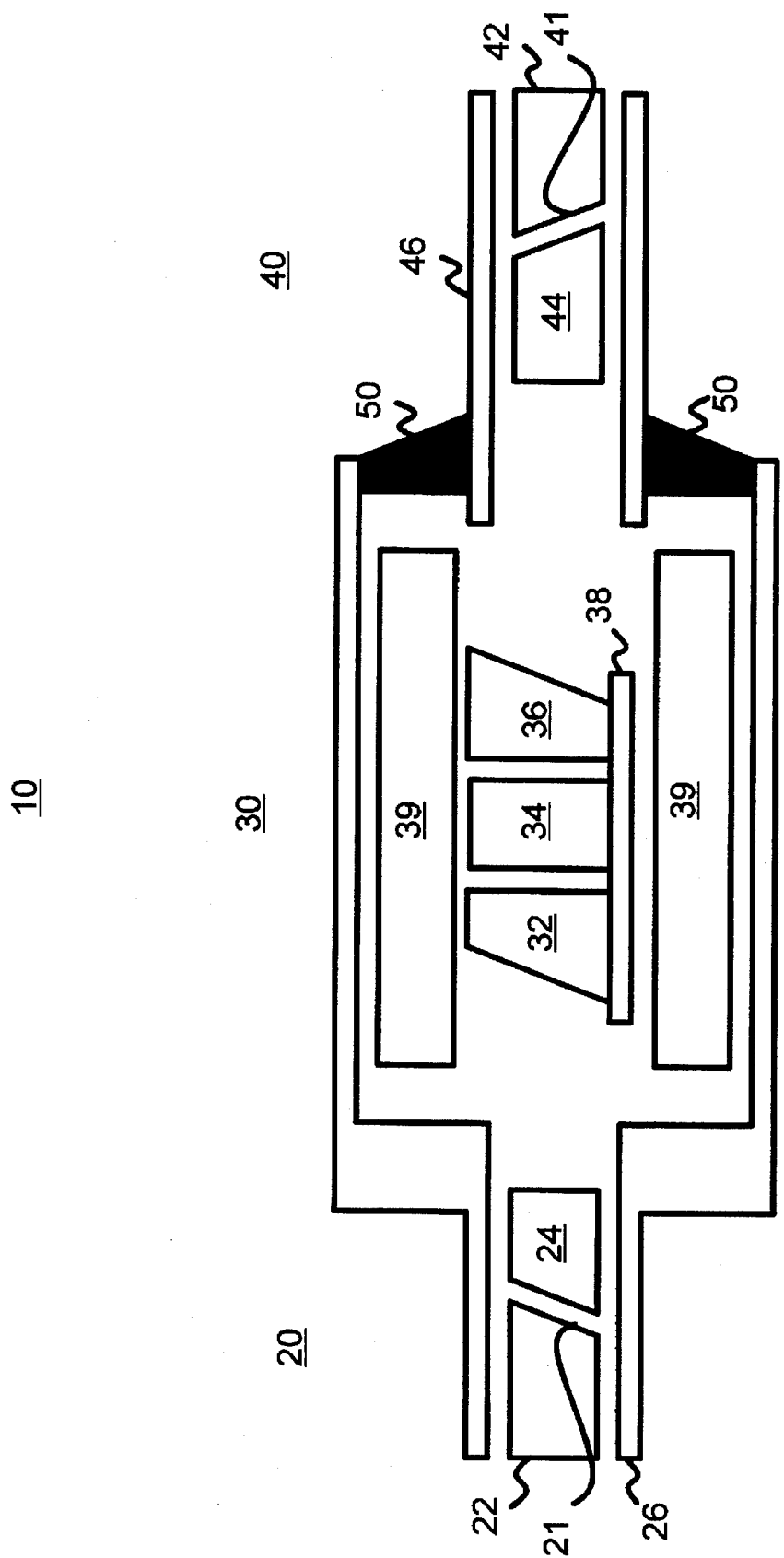
FIG. 1 is a diagram of a typical optical isolator.

FIG. 1 is a diagram of a typical optical isolator 10. The optical isolator 10 transmits light in the forward direction, from an input fiber 21 to an output fiber 41. However, light traveling in the reverse direction, from the output fiber 41 to the input fiber 21, is not transmitted. The optical isolator 10 is comprised of a first collimator 20, a core 30, and a second collimator 40. A first microcapillary 22, a first GRIN (GRaduated INdex) lens 24, and a first metal collimator holder 26 comprise a first collimator 20. The first collimator 20 has an input signal from an input signal fiber 21. The first microcapillary 22 aligns the input fiber 21. The GRIN lens 24 collimates the light transmitted by the input fiber 21. A second collimator 40 is comprised of a second microcapillary 42, a second GRIN lens 44, and a second collimator holder 46. The second collimator 40 passes the signal to the output fiber 41. The second GRIN lens 44 focuses the signal to the end of the output fiber 41. The second microcapillary 42 aligns the output fiber 41.

Light entering the optical isolator 10 from the input fiber 21 is collimated by the first GRIN lens 24. The collimated light then travels to a core 30.

The core 30 is comprised of a first polarizer 32, a faraday rotator 34, a second polarizer 36, a core assembly holder 38, and a magnetic robe 39. The first polarizer 32 and the second polarizer 36 are typically birefringent crystals. The first polarizer 32 transmits an ordinary ray and an extraordinary ray. The ordinary ray has its polarization in the direction of the optic axis of the first polarizer 32. The extraordinary ray has its polarization perpendicular to the direction of the optic axis of the first polarizer 32. A Faraday rotator 34 rotates the polarization of the transmitted light by a predetermined number of degrees (in this embodiment 45 degrees). Thus, the direction of polarization of both the ordinary and the extraordinary ray is rotated by 45 degrees. The second polarizer 36 has its optic axis rotated by a predetermined number of degrees (45 degrees) from that of the first polarizer 32. Thus, the second polarizer 36 transmits both the ordinary and the extraordinary rays.

Light transmitted by the second polarizer 36 travels through the second collimator 40, and is focused to the surface of the output fiber 42. The output fiber 42 carries the signal out of the optical isolator 10.

Reflected light traveling from the output fiber 41 towards the input fiber 21 encounters the second polarizer 36. The second polarizer 36 transmits an ordinary ray and an extraordinary ray. The optic axis of the second polarizer 36 is still oriented 45 degrees from the optic axis of the first polarizer 32. The polarization of the reflected light is then rotated by a predetermined number of degrees (45 degrees) by the faraday rotator 34. Thus, the polarization of both the ordinary and extraordinary ray is rotated by a predetermined number of degrees (45 degrees). The Faraday rotator 34 rotates polarization in the same direction regardless of whether light is traveling forward or backward in the optical isolator. The direction of polarization of ordinary ray is, therefore, in a preferred embodiment 90 degrees from the optic axis of the first polarizer 32. The polarization of the extraordinary ray is in the direction of the optic axis of the first polarizer 32. Consequently, reflected light transmitted by the first polarizer 32 is not comprised of parallel rays. Because of this, the GRIN lens 24 does not focus the reflected light onto the end of the input fiber 21. Reflected light is thereby prevented from traveling back down the input fiber 21. However, if the surfaces of the components of the optical isolator 10 are contaminated, more reflected light will be transmitted back through the input fiber 21.

Although the optical isolator 10 shown in FIG. 1 is functional, those with ordinary skill in the art will realize it is inefficient. First and second metal collimator holders 26 and 46 lower the efficiency of the optical isolator 10 because they are be machined. In order to properly collimate and transmit light, the components of the first collimator 20 and the second collimator 40 must be aligned. The concentricity of the components of the first collimator 20 and the second collimator 40 are determined by the first metal collimator holder 26 and the second metal collimator holder 46, respectively. Because the first and the second metal collimator holders 26 and 46 are machined, they are concentric only to within approximately 0.0015 inch. Thus, the insertion loss of optical isolator 10 is typically on the order of 0.25 dB. Machining also results in a burr on the machined part. This burr reduces return loss.

In addition, because the core assembly holder 38 is flat, the first polarizer 32, the faraday rotator 34, and the second polarizer 36 must be the same size. Consequently it is impossible to adjust the orientation between the first polarizer 32 and the second polarizer 36. Because the orientation of the first and the second polarizers 32 and 36 cannot be changed, the isolation peak position cannot be adjusted to optimize optical performance.

Because the second collimator 40 must be mechanically stable, the joints 50 are applied. If the joints 50 are made of epoxy, the joints 50 will be subject to damage due to drastic temperature changes. Thus, the optical isolator 10 will be unable to function due to exposure to a variety of environments.

If the joints 50 are comprised of solder, the optical isolator 10 suffers from other problems due to conventional soldering techniques. If the joints 50 are made using traditional high temperature soldering techniques, the performance of the optical isolator 10 is adversely affected. If lower temperature solder is used to make the joints 50, the soldering process is costly. In addition, the flux which must be used with many low temperature solders can contaminate the components of the optical isolator 10. Contamination introduced by the flux will reduce the return loss of the optical isolator 10. Although typical soldering techniques may employ masks in order to block flux from entering the optical isolator 10, there is still a significant risk that flux will contaminate the components of the optical isolator 10. The masking process also complicates assembly of the optical isolator 10. Finally, if the solder joints 50 are made using low temperature solder, the joints 50 will be weaker than if they were made using high temperature solder.

The present invention provides a method and system for an optical isolator which has low insertion loss and high return loss, and is environmentally stable. In addition, the method and system provide an optical isolator which can be adjusted to enhance optical performance and is mechanically stable. Assembly of the optical isolator made in accordance with the method and system is also less complex than an optical isolator made using low temperature soldering techniques. Finally, the method and system also provide an optical isolator which is less expensive than typical optical isolators.

Figure 2:
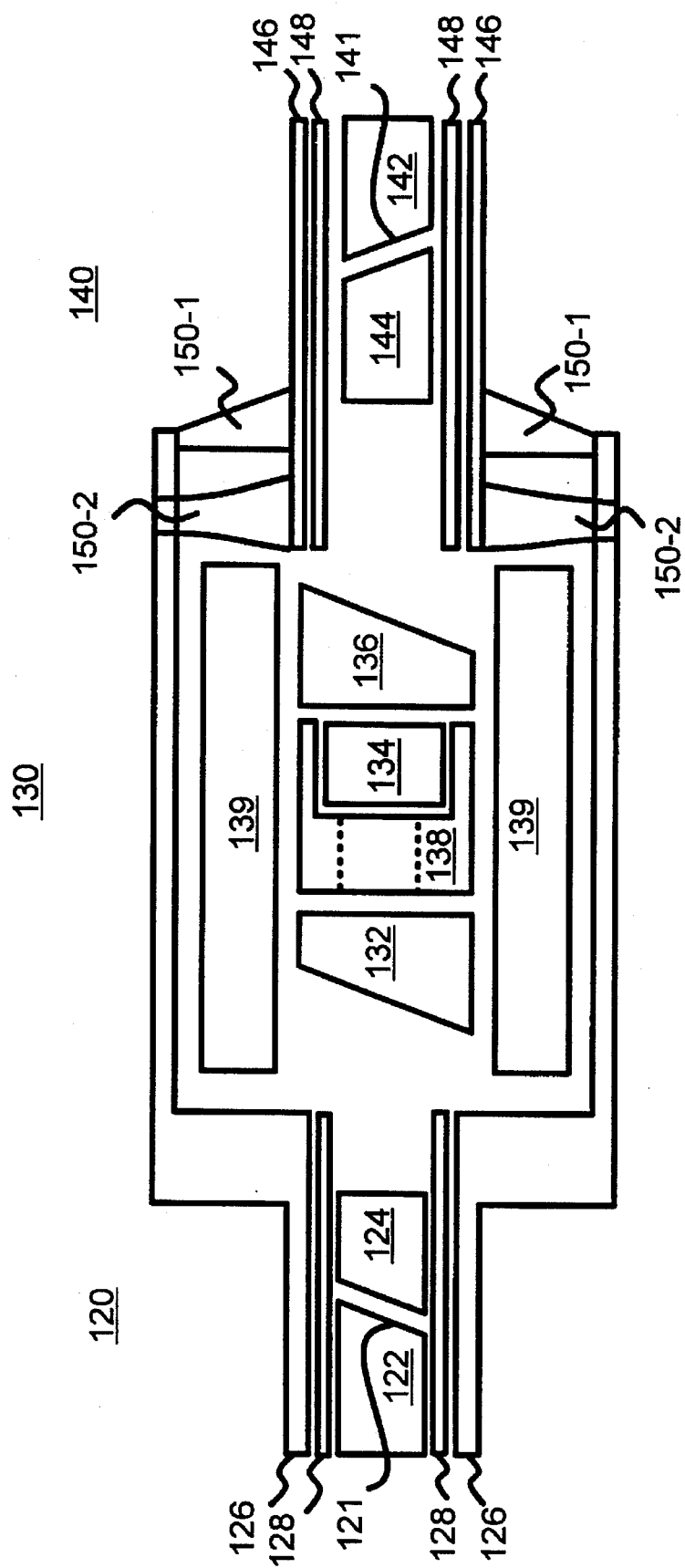
FIG. 2 is a diagram of one embodiment of an optical isolator in accordance with the method and system.

FIG. 2 displays an optical isolator 100 in accordance with the method and system. The optical isolator 100 is comprised of the first collimator 120, the core 130, and the second collimator 140. One aspect of the method and system improves the first collimator 120 and the second collimator 140.

Figure 3:
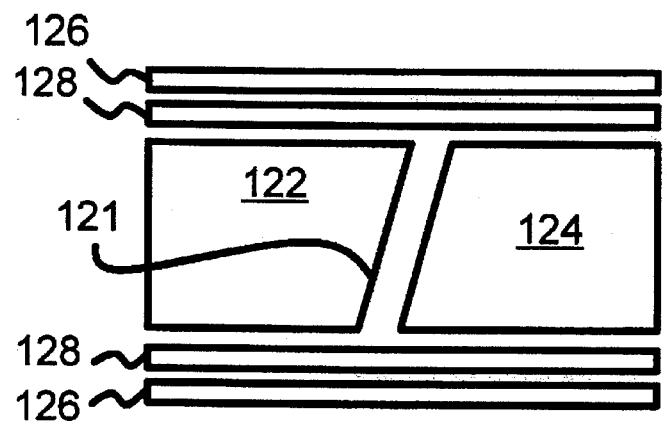
FIG. 3 is a diagram of a collimator in accordance with one embodiment of the method and system.

FIG. 3 displays the first collimator 120 made in accordance with one embodiment of the method and system. A microcapillary 122 and a GRIN lens 124 are aligned by a first quartz collimator holder 128. Because the first quartz collimator holder 128 is made in accordance with current crystal growth technology, its concentricity is approximately 0.0005 inch. Thus, the insertion loss is reduced to about 0.15 dB. In addition, the surface of the quartz collimator holder 128 is significantly smoother than that of a machined piece. Thus, the return loss is increased. Finally, the first quartz alignment holder 128 is placed in the first metal collimator holder 126 in order to provide the electrical properties necessary for the optical isolator 100.

Referring back to FIG. 2, a second collimator 140 comprises a second microcapillary 142, a second GRIN lens 144, a second quartz collimator aligner 148, and a second metal collimator holder 146. Because the second quartz collimator aligner 148 functions as does the first quartz collimator aligner 128, the second quartz collimator aligner 148 reduces the insertion loss and increases return loss of the second quartz collimator 140.

Referring back to FIG. 1, the first polarizer 32, the faraday rotator 34, and the second polarizer 36 are held inside the magnetic tube 39 by the core assembly holder 38. Because the core assembly holder 38 is flat, the faraday rotator 34 must be the same size as the first polarizer 32 and the second polarizer 36. Thus, it is not possible to adjust the orientation between the two polarizers to enhance optical performance of the optical isolator 10.

Figure 4:
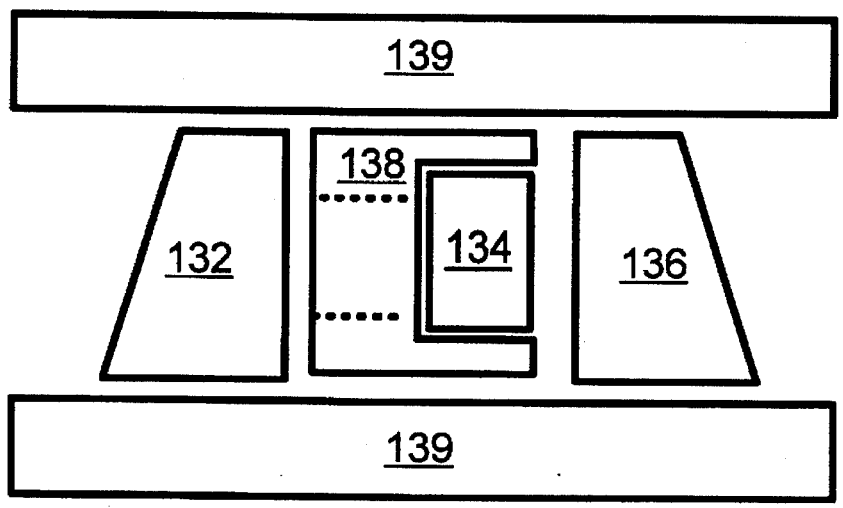
FIG. 4 is a diagram of one embodiment of a core assembly in accordance with one embodiment of the method and system.

Referring now to FIG. 2, another aspect of the method and system improves a core 130 of the optical isolator 100. FIG. 4 displays a core assembly 130 made in accordance with the method and system. The core assembly 130 is comprised of the first polarizer 132, the faraday rotator 134, the second polarizer 136, the core assembly holder 138, and the magnetic tube 139. The core assembly holder 138 allows a smaller faraday rotator 134 to be used than in conventional designs. Because the faraday rotator 134 is smaller, it is less costly. The overall cost of the optical isolator is thereby decreased. In addition, the orientation of the first polarizer 132 and the second polarizer 136 can be adjusted. Consequently, the isolation peak position can be modified. Because the isolation peak position can be adjusted, the optical performance of the core assembly 130 and the optical isolator 100 is enhanced.

Referring now to FIG. 2, a third aspect of the method and system can be seen in the attachment of the second collimator 140 to the core 130. The second collimator 140 is attached to the core 130 through the solder joints 150-1 and 150-2. Referring back to FIG. 1, a typical optical isolator 10 only has the joints 50. Referring now to FIG. 2, the solder joints 150-2 have been added. Each solder joint 150-2 is formed by filling an aperture in an outer portion 131 of the core 130 with solder. The solder attaches the outer portion 131 of the core 130 to the second collimator holder 146. The solder joints 150-2 provide increased mechanical stability over single solder joints. In addition, because no epoxy is used, the optical isolator 100 is capable of withstanding wide variations in temperature.

In order to lower the insertion loss of the optical isolator 100 and to simplify soldering, flux-less soldering techniques were developed. Typical soldering techniques require the use of flux to remove the oxidation layer on parts which are to be soldered. As previously discussed, flux contaminates the collimator components and the faraday rotator 134. In order to help prevent flux contamination, masks can be used to block the entry of flux into an optical isolator. However, masks complicate the soldering process and may not be completely effective in preventing entry of flux into an optical isolator.

In order to prevent contamination without complicating the soldering process, the collimator holder 146 is comprised of brass and gold plated using a process based on the Mil-G-45204 procedure. The optimal thickness of this gold plating is approximately 90 micrometers. Soldering can then be accomplished without the use of flux.

As previously stated, solder used must be lower temperature solder in order to prevent temperature damage to the components of the optical isolator 100. However, low temperature solders are often very expensive, which would further increase the cost of the optical isolator 100. For example, a typical low temperature solder requires a soldering temperature of approximately 118 degrees C. and costs approximately $700 per pound. A range of soldering temperatures, below 250 degrees C., were found in which little damage to the optical isolator. In addition, a low temperature solder, Sn63Pb37, which works within this temperature range and is relatively inexpensive, was found. Sn63Pb37 costs only about $20 per pound and has a soldering temperature of approximately 180 degrees C.

A method and system has been disclosed for an optical isolator. The method and system have a lower ratio of insertion loss to return loss, the requisite mechanical characteristics, is capable of optimizing optical performance, and which can be used in a variety of environments. An optical isolator made in accordance with the method and system need not be exposed to high temperatures during assembly. Finally, the method and system can be provided at lower cost.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical isolator comprising:
    a first collimating means, the first collimating means further comprising
        a first optical fiber holder,
        a first lens located opposite to the first optical fiber holder,
        a first quartz collimator aligner for aligning the first optical fiber holder and the first lens,
        a first collimator holder disposed around the first quartz collimator aligner;
    a core, the core further comprising
        a first polarizer,
        a second polarizer, and
        a polarization rotation means located between the first polarizer and the second polarizer; and
    a second collimating means, the second collimating means further comprising
        a second optical fiber holder,
        a second lens located opposite to the optical fiber holder,
        a second quartz collimator aligner for aligning the second optical fiber holder and the second lens, and
        a second collimator holder disposed around the second quartz collimator aligner.

2. The optical isolator of claim 1 wherein the first quartz collimator aligner has an aperture therein, the first optical fiber holder and the first lens being disposed in the aperture in the first quartz collimator aligner; and
    the second quartz collimator aligner has an aperture therein, the second optical fiber holder and the second lens being disposed in the aperture in the second quartz collimator aligner.

3. The optical isolator of claim 1 wherein the first optical fiber holder comprises a microcapillary; and the second optical fiber holder comprises a microcapillary.

4. The optical isolator of claim 3 wherein the polarization rotation means comprises a faraday rotator.

5. An optical isolator comprising:
    a first collimating means, the first collimating means further comprising a first optical fiber holder, and
a first lens located opposite to the first optical fiber holder;
a core, the core further comprising
a first polarizer,
a second polarizer
a core assembly holder located between the first polarizer and the second polarizer, and
polarization rotation means disposed in the core assembly holder; and
a second collimating means, the second collimating means further comprising
a second optical fiber holder, and
a second lens located opposite to the second optical fiber holder.

6. The optical isolator of claim 1 wherein the core further comprises a core assembly holder located between the first polarizer and the second polarizer; the polarization rotation means being disposed in the core assembly holder.

7. An optical isolator comprising:
a first collimating means, the first collimating means further comprising
a first optical fiber holder, and
a first lens located opposite to the first optical fiber holder;
a core, the core further comprising
a first polarizer,
a second polarizer,
a polarization rotation means located between the first polarizer and the second polarizer, and
a core holder disposed around the first polarizer, the polarization rotation means, and the second polarizer, the core holder having at least one aperture therein;
a second collimating means, the second collimating means further comprising
a second optical fiber holder,
a second lens located opposite to the second optical fiber holder, and
a second collimator holder disposed around the second optical fiber holder and the second lens; and
a plurality of solder joints connecting the second collimator holder to the core holder, each of a portion of the plurality of solder joints being at least partially disposed in each of the at least one aperture in the core holder.

8. The optical isolator of claim 1 wherein the core further comprises a core holder disposed around the first polarizer, the polarization rotation means, and the second polarizer, the core holder having at least one aperture therein; and
wherein the optical isolator further comprises a plurality of solder joints connecting the second collimator holder to the core holder, each of a portion of the plurality of solder joints being at least partially disposed in each of the at least one aperture in the core holder.

9. The optical isolator of claim 5 wherein
the second collimating means further comprises a second collimator holder;
the core further comprises a core holder disposed around the first polarizer, the polarization rotation means, and the second polarizer, the core holder having at least one aperture therein; and
the optical isolator further comprises a plurality of solder joints connecting the second collimator holder to the core holder, each of a portion of the plurality of solder joints being at least partially disposed in each of the at least one aperture in the core holder.

10. The optical isolator of claim 6 wherein the core further comprises a core holder disposed around the first polarizer, the polarization rotation means, and the second polarizer, the core holder having at least one aperture therein; and
wherein the optical isolator further comprises a plurality of solder joints connecting the second collimator holder to the core holder, each of a portion of the plurality of solder joints being at least partially disposed in each of the at least one aperture in the core holder.

11. The optical isolator of claim 7 wherein at least a second portion of the solder joints are flux-less solder joints.

12. The optical isolator of claim 11 wherein a portion of the second collimator holder comprises brass; and wherein the flux-less solder joints further comprise solder and gold plating.

13. The optical isolator of claim 12 wherein the gold plating is 90 micrometers thick.

14. The optical isolator of claim 13 wherein the solder is Sn63Pb37.

15. The optical isolator of claim 8 wherein at least a second portion of the solder joints are flux-less solder joints.

16. The optical isolator of claim 15 wherein a portion of the second collimator holder comprises brass; and wherein the flux-less solder joints further comprise solder and gold plating.

17. The optical isolator of claim 16 wherein the gold plating is 90 micrometers thick.

18. The optical isolator of claim 17 wherein the solder is Sn63Pb37.

19. The optical isolator of claim 9 wherein at least a second portion of the solder joints are flux-less solder joints.

20. The optical isolator of claim 19 wherein a portion of the second collimator holder comprises brass; and wherein the flux-less solder joints further comprise solder and gold plating.

21. The optical isolator of claim 20 wherein the gold plating is 90 micrometers thick.

22. The optical isolator of claim 21 wherein the solder is Sn63Pb37.

23. The optical isolator of claim 10 wherein at least a second portion of the solder joints are flux-less solder joints.

24. The optical isolator of claim 23 wherein a portion of the second collimator holder comprises brass; and wherein the flux-less solder joints further comprise solder and gold plating.

25. The optical isolator of claim 24 wherein the gold plating is 90 micrometers thick.

26. The optical isolator of claim 25 wherein the solder is Sn63Pb37.

27. A method for producing an optical isolator, the method comprising the steps of:
providing a first collimating means, the step of providing a first collimating means further comprising the steps of:
providing a first optical fiber holder,
providing a first lens located opposite to the first optical fiber holder,
providing a first quartz collimator aligner for aligning the first optical fiber holder and the first lens, and
providing a first collimator holder disposed around the first quartz collimator aligner;
providing a core, the step of providing a core further comprising the steps of
providing a first polarizer,
providing a second polarizer, and
providing a polarization rotation means located between the first polarizer and the second polarizer; and providing a second collimating means, the step or providing a second collimating means further comprising the steps of
  providing a second optical fiber holder, and
  providing a second lens located opposite to the second optical fiber holder.

28. The method of claim 27 wherein the step of providing a first quartz collimator holder further comprises the steps of: providing a first quartz collimator holder having an aperture therein; and
  locating the first optical fiber holder and the first lens within the aperture in the first quartz collimator holder.

29. The method of claim 28 wherein the step of providing the second collimating means further comprises the steps of:
  providing a second quartz collimator aligner for aligning the second optical fiber holder and the second lens; and
  providing a second collimator holder disposed around the second quartz collimator aligner.

30. The method of claim 29 wherein the step of providing a second quartz collimator aligner further comprises the steps of:
  providing a second quartz collimator holder having an aperture therein; and
  locating the second optical fiber holder and the second lens within the aperture in the second quartz collimator holder.

31. The method of claim 30 wherein the steps of providing the core further comprises the steps of:
  providing a core assembly holder located between the first polarizer and the second polarizer; and
  disposing the polarization rotation means within the core assembly holder.

32. The method of claim 31 wherein the step of providing the core further comprises:
  providing a core holder having at least one aperture disposed therein; and wherein the method further comprises the step of:
  providing a plurality of solder joints connecting the second collimator holder to the core holder,
  the step of providing a plurality of solder joints further comprising the step of at least partially disposing each of a portion of the plurality of solder joints in each of the at least one aperture in the core holder.

33. The method of claim 32 wherein the step of providing a plurality of solder joints further comprises the step of making at least a second portion of the solder joints flux-less solder joints.

34. The method of claim 33 wherein the at least a portion of the second collimator holder comprises brass; and wherein the step of providing flux-less solder joints further comprises the steps of gold plating second collimator holder.

35. The method of claim 34 wherein the gold plating step further comprises the step of gold plating the second collimator holder to a thickness of 90 micrometers.

36. The method of claim 34 wherein the solder is Sn63Pb37.

* * * * *